United States Patent
Legg et al.

(10) Patent No.: US 7,624,405 B1
(45) Date of Patent: Nov. 24, 2009

(54) MAINTAINING AVAILABILITY DURING CHANGE OF RESOURCE DYNAMIC LINK LIBRARY IN A CLUSTERED SYSTEM

(75) Inventors: Chris B. Legg, Oceanside, CA (US); Brenda Ann Moreno, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 1057 days.

(21) Appl. No.: 11/156,029

(22) Filed: Jun. 17, 2005

(51) Int. Cl.
- *G06F 3/00* (2006.01)
- *G06F 9/44* (2006.01)
- *G06F 9/46* (2006.01)
- *G06F 13/00* (2006.01)

(52) U.S. Cl. .................. 719/331; 717/162; 717/168; 709/220; 709/223

(58) Field of Classification Search ................ 719/331; 717/162, 168; 709/220, 223
See application file for complete search history.

(56) References Cited

U.S. PATENT DOCUMENTS

| | | | |
|---|---|---|---|
| 6,438,705 B1 * | 8/2002 | Chao et al. .................. | 714/4 |
| 6,442,752 B1 * | 8/2002 | Jennings et al. ............. | 717/162 |
| 6,665,735 B1 * | 12/2003 | Tanaka et al. ................ | 719/331 |
| 7,461,374 B1 * | 12/2008 | Balint et al. ................. | 717/174 |
| 2002/0073410 A1 * | 6/2002 | Lundback et al. ........... | 717/171 |
| 2002/0194578 A1 * | 12/2002 | Irie et al. ..................... | 717/122 |
| 2003/0074426 A1 * | 4/2003 | Dervin et al. ............... | 709/220 |
| 2004/0254984 A1 * | 12/2004 | Dinker ....................... | 709/205 |
| 2005/0010915 A1 * | 1/2005 | Chen .......................... | 717/170 |
| 2005/0071837 A1 * | 3/2005 | Butt et al. ................... | 717/168 |

\* cited by examiner

*Primary Examiner*—Diem Ky Cao
(74) *Attorney, Agent, or Firm*—James E. Goepel; Phuong-Quan Hoang

(57) ABSTRACT

An embodiment of the invention is a technique for maintaining application availability during a change in a resource dynamic link library (DLL). A shim resource DLL is linked to a resource DLL managed by a resource manager in a clustered system. The managed resource DLL exports a function to control a resource in the clustered system. During a normal mode, the shim resource DLL passes to the managed resource DLL a call to an exported function unchanged. During a change mode, the shim resource DLL is unlinked from the managed resource DLL to allow the managed resource DLL to be changed, and the shim resource DLL handles a call to an exported function without passing the call to the managed resource DLL.

20 Claims, 8 Drawing Sheets

MAINTAINING AVAILABILITY DURING CHANGE OF RESOURCE DYNAMIC LINK LIBRARY IN A CLUSTERED SYSTEM

BACKGROUND

1. Field of the Invention

Embodiments of the invention are in the field of clustered computer systems, and more specifically, relate to techniques for changing a resource dynamic link library (DLL) in a clustered computer system.

2. Description of Related Art

A cluster is a group of computers that work together to run a common set of applications and appear as a single system to the client and applications. In a traditional cluster, the computers are physically connected by cables and programmatically connected by cluster software. These connections allow the computers to use failover and load balancing, which is not possible with a stand-alone computer.

A clustered system typically has a variety of resources. Clustered resources may include a disk drive, a logical unit on redundant arrays of inexpensive disks (RAIDS) subsystem, an Internet Protocol (IP) address, a network name, an application program, etc. Many clustered systems allow the management of clustered resources in a separate executable library associated with a resource, referred to as a resource dynamic link library (DLL).

When a resource DLL is changed, e.g., upgraded, updated, modified or replaced with a newer version, the associated resource is taken off line or moved to another member computer in the clustered system during the change process. In some clustered systems, each member computer may have to be re-booted in order to complete this resource DLL change process. In a high-availability environment, such as that of a clustered system, such a temporary unavailability of a resource or system interruption may not be acceptable.

Thus, it is desirable to have a technique to provide availability in a clustered system during a change of a resource DLL.

SUMMARY OF THE INVENTION

An embodiment of the invention is a technique for maintaining application availability during a change in a resource dynamic link library (DLL). A shim resource DLL is linked to a resource DLL managed by a resource manager in a clustered system. The managed resource DLL exports a function to control a resource in the clustered system. During a normal mode, the shim resource DLL passes to the managed resource DLL a call to an exported function unchanged. During a change mode, the shim resource DLL is unlinked from the managed resource DLL to allow the managed resource DLL to be changed, and the shim resource DLL handles a call to an exported function without passing the call to the managed resource DLL.

BRIEF DESCRIPTION OF THE DRAWINGS

Embodiments of the invention may best be understood by referring to the following description and accompanying drawings that are used to illustrate embodiments of the invention. In the drawings.

DESCRIPTION

Figure 1:
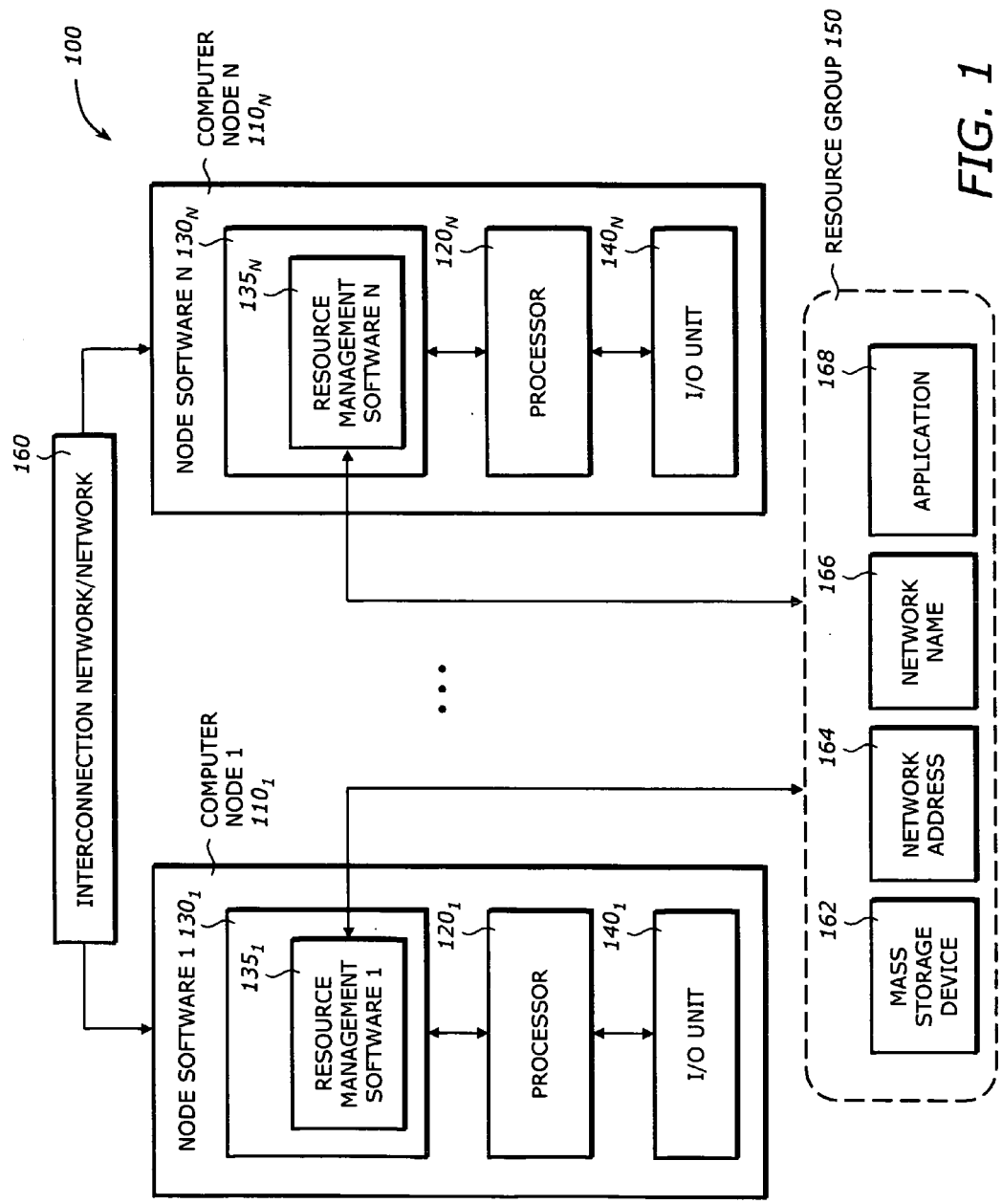
FIG. 1 is a diagram illustrating a system in which one embodiment of the present invention may be practiced.

An embodiment of the invention is a technique for maintaining application availability during a change in a resource dynamic link library (DLL). A shim resource DLL is linked to a resource DLL managed by a resource manager in a clustered system. The managed resource DLL exports a function to control a resource in the clustered system. During a normal mode, the shim resource DLL passes to the managed resource DLL a call to an exported function unchanged. During a change mode, the shim resource DLL is unlinked from the managed resource DLL to allow the managed resource DLL to be changed, and the shim resource DLL handles a call to an exported function without passing the call to the managed resource DLL.

The shim resource DLL is dynamically linked to the managed resource DLL and the resource manager during an initialization mode or after the change mode. The function exported by the managed resource DLL may be one the following: an On_Line function, an Off_Line function, an Is_Alive function, and a Resource Control function. During the change mode, the shim resource DLL returns success to a call to the Is_Alive function, and returns error to any call to one of the On_Line function, the Off_line function, and the Resource Control function. In this manner, the change to the managed resource DLL may be transparent to the operations of the system and availability of application or system is maintained. The resource may be one of a mass storage device, a device driver, a network address, a network name, an application program, a system service, and a system software module.

In the following description, numerous specific details are set forth. However, it is understood that embodiments of the invention may be practiced without these specific details. In other instances, well-known circuits, structures, and techniques have not been shown in order not to obscure the understanding of this description.

Elements of one embodiment of the invention may be implemented by hardware, firmware, software or any combination thereof. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine-readable code to perform the operations described above. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc.

FIG. 1 is a diagram illustrating a system 100 in which one embodiment of the present invention may be practiced. The system 100 includes N computer nodes $110_1$ to $110_N$ where N is a positive integer, and a resource group 150.

The N computer nodes $110_1$ to $110_N$ form a clustered system. Each of the nodes $110_1$ to $110_N$ may be a computer or a server. The N computer nodes $110_1$ to $110_N$ may be homogeneous or heterogeneous. In one embodiment, they have identical cluster software components that may be configured according to the specific environment or platform. The computer node includes a node processor $120_1$, a node software $130_1$, and input/output (I/O) unit $140_1$. Each of the nodes $110_1$ to $110_N$ may have a local memory, mass storage device, peripheral devices, a network interface device, and any other components, which are not shown for clarity. The N computer nodes $110_1$ to $110_N$ may be interconnected via an interconnection network/network 160. The interconnection network/network 160 may be any suitable network having any topology such as bus interconnect, hierarchical interconnect, cross-bar switch, hypercube, multi-stage interconnection, Local Area Network (LAN), Wide Area Network (WAN), intranet, extranet, the Internet, wireless network, etc.

The processor $120_1$ represents a central processing unit of any type of architecture, such as embedded processors, single core processors, multi-core processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The node software $130_1$ contains the software that is run on the computer node $110_1$. It includes a cluster software, a resource management software $135_1$, and application programs. Application programs may include any application programs to perform application-level tasks. They may also include redundant applications that are used to support high availability and fault-tolerant applications. The cluster software is common to all the nodes in the N computer nodes $110_1$ to $110_N$. Identical cluster-level software, including cluster operating system and drivers, resides in each of the N computer nodes $110_1$ to $110_N$. The resource management software $135_1$ includes software components or programs that manage the resource group 150. Part of the resource management software $135_1$ overlaps with the cluster software (see FIG. 2). The management tasks may include failover operations, application migration, failure detection, resource utilization, resource allocation, etc. In particular, the resource management software $135_1$ includes functionalities to maintain high availability of resources when there is a change (e.g., upgrade, replacement) in the associated resource DLL, control programs or functions.

The resource group 150 includes a number of resources that support the N computer nodes $110_1$ to $110_N$. The resource group 150 may include any type of resource that may be utilized by an application program, such as a mass storage device 162, a network address 164, a network name 166, an application program 168. The mass storage device 162 is any non-volatile memory subsystem such as hard disk drive, optical disk, redundant arrays of inexpensive disks (RAID), tape drive, etc. The network address 164 contains the address of the network such as the Internet Protocol (IP) address. The network name 166 is the name of the network. The application 168 is an application program that uses the resource group 150.

The computer node k $110_k$, where k=2, . . . , N, contains essentially similar components as the computer node $110_1$. For example, the computer node N $110_N$ includes a node processor $120_N$, a node software $130_N$, and an I/O unit $140_N$. These components are similar to the node processor $120_1$, the node software $130_1$, and the I/O unit $140_1$ described above.

Figure 2:
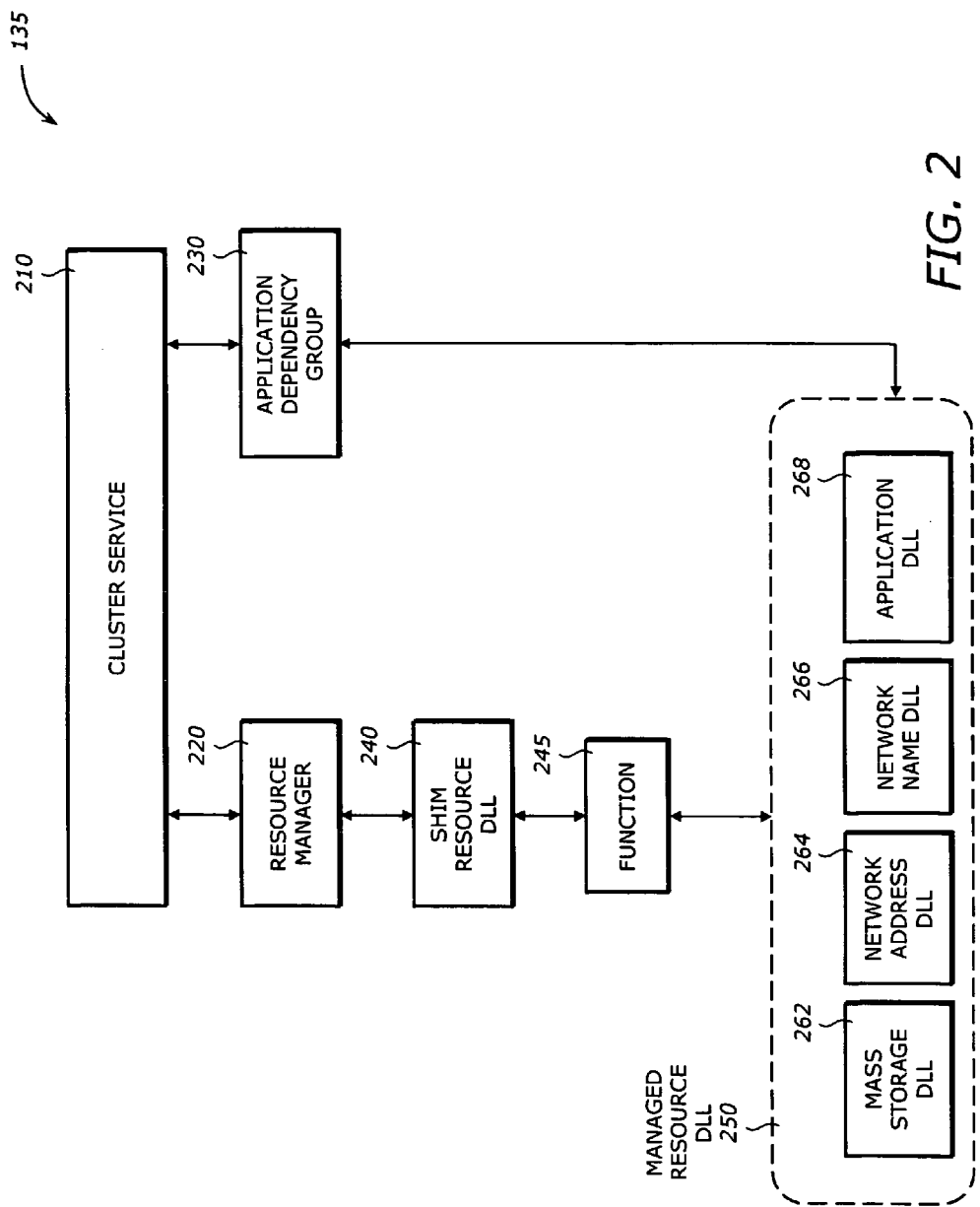
FIG. 2 is a diagram illustrating a resource management software according to one embodiment of the invention.

FIG. 2 is a diagram illustrating the resource management software 135 shown in FIG. 1 according to one embodiment of the invention. The resource management software 135 is representative of the individual resource management software $135_i$ where i=1, . . . , N in each of the computer nodes $110_1$ to $110_N$. The resource management software 135 includes a cluster service module 210, a resource manager 220, an application dependency group 230, a shim resource DLL 240, and a managed resource DLL 250.

The cluster service module 210 includes software, programs, or functions that provide clustering service for the clustered system. It is part of a cluster software such as the Microsoft Cluster Service (MSCS).

The resource manager 220 provides a communication, monitoring, and processing layer between the cluster service 210 and one or more resources. The resource manager 220 is also part of the cluster software. The resource manager 220 manages the use of the resource group 150 (shown in FIG. 1). The functions of the resource manager 220 may include resource administration, allocation of resources, arbitration, conflict resolution, etc. To initiate an operation on a resource, the cluster service uses the resource manager to invoke the appropriate entry point function in the resource DLL the supports the resource. An entry point function in the resource DLL is also known as a function exported from the resource DLL. The resource manager 220 may pass, from the cluster service 210, a call to a function that is associated with the resource group 150. It may also receive status or return of a function call and forward it to the cluster service.

The application dependency group 230 includes grouping of resources used by an application program. It interfaces with and supported by the individual resource DLLs that control the respective resources within the application dependency group 230. The managed resource DLL 250 may be any one of these individual resource DLLs. When any resource within the group 230 fails, the cluster software attempts to move the group 230 to another computer node in the cluster. For example, when a cable connecting a disk drive fails, the disk resource DLL detects that it can no longer access the disk drive. It then sets the status of the disk resource as failed and notifies the cluster software. The cluster software, upon receipt of the failure notification, brings the application dependency group 230 on line on another computer node of the clustered system.

The shim resource DLL 240 of the present invention provides a communication and processing layer between the resource manager 220 and the managed resource DLL 250 to maintain availability of the application that uses the resource supported by the managed resource DLL 250 during a change of the managed resource DLL 250. The shim resource DLL 240 is linked to the resource manager 220 and the managed resource DLL 250. The shim resource DLL 240 may have a number of operational modes. It may pass to the managed resource DLL 250 a call to a function 245 exported from the managed resource DLL 250. It may receive a function status from the function 245. It may also return a function status to the resource manager 220.

The function 245 is associated with a resource controlled by the managed resource DLL 250. The function 245 may be called by the cluster service 210, via the resource manager 220, or by an application program via the cluster service 210, to perform a control function on the specified resource. It may return a status of the operation. The status may be a success status, an error or failure status, or other status.

The managed resource DLL 250 is a resource DLL that is managed by the resource manager 220. The managed resource DLL 250 is associated with and supports one of the resources in the resource group 150 (shown in FIG. 1). It may be a mass storage DLL 262, a network address DLL 264, a network name DLL 266, or an application program DLL 268, corresponding to the mass storage device 162, the network address 164, the network name 166, and the application 168 (shown in FIG. 1), respectively. The managed resource DLL 250 may be changed because it may contain a bug, a fault, a defect, or need improvement. The change may include an upgrade, an update, a modification, or a replacement with a new version. When the managed resource DLL 250 is changed, the associated resource may have to be taken off line or moved to another member computer node of the clustered system. During this time, the resource may become unavailable for the application. Without the shim resource DLL 240 of the present invention, the application may undergo a temporary downtime or unavailability.

In one embodiment of the invention, the managed resource DLL 250 is a custom resource DLL created using the Microsoft Visual C++® development system. Microsoft Corporation has published a number of Technical Articles for Writing Microsoft Cluster Server (MSCS) Resource DLLs. These articles describe in detail how to use the Microsoft Visual C++® development system to develop resource DLLs. Resource DLLs are created by running the "Resource Type AppWizard" of Microsoft Corporation within the developer studio. This builds a skeletal resource DLL and/or Cluster Administrator extension DLL. The skeletal resource DLL provides only the most basic capabilities. The skeletal resource DLL is then customized to produce the managed resource DLL 250.

Figure 3:
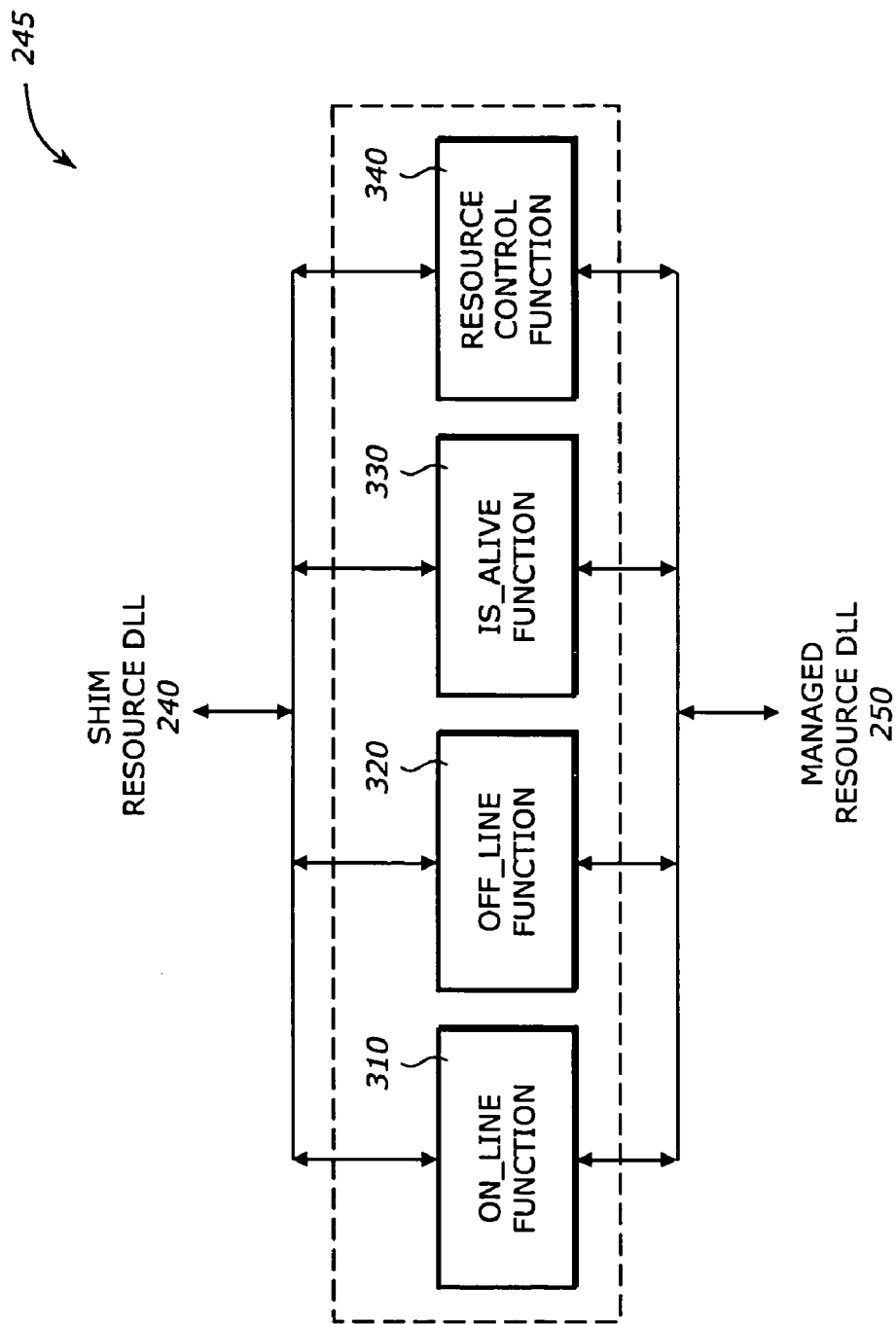
FIG. 3 is a diagram illustrating a function exported from a resource DLL according to one embodiment of the invention.

FIG. 3 is a diagram illustrating a function 245 (shown in FIG. 2) exported from a resource DLL according to one embodiment of the invention. The function 245 may be used by the resource manager 220 to control a resource during normal operation, a failover, or an application migration. The function 245 includes an On_Line function 310, an Off_Line function 320, an Is_Alive function 330, and a Resource Control function 340.

The On_Line function 310 brings the resource on line, i.e., starts the resource and makes it available to the clustered system. It is typically used during initialization, failover, moving an application, or after a change of the resource DLL. The Off_Line function 320 takes the resource off line, i.e., performs a graceful shutdown of the resource. It is typically used when a failure is detected or when moving an application to another computer node in the clustered system. The Is_Alive function 330 determines if a resource is actually operational. It is typically used during periodic checking of "heartbeats". The Resource Control function 340 provides resource specific control operation. It provides for resource specific directives to be sent to the resource DLL 250.

Typically, the On_Line and Off_Line functions 310 and 320 are used rarely. The Resource Control function 340 is also not used frequently. The Is_Alive function 330, however, is used much more frequently. It may be called as often as once per second to monitor the health or status of the resource to ensure that the resource is operational. The Is_Alive function 330 represents functions that are frequently called. The On_Line function 310, the Off_Line function 320, and the Resource Control function 340 represent functions that are non-frequently called.

The On_Line and Off_Line functions 310 and 320 and the Is_Alive function 330 may be used during a failover in which resources may be moved across the cluster from one computer node to another computer node, or in an application migration where an application is moved across the cluster. A typical failover scenario is as follows. The cluster software on a first computer node detects a failed resource as a result of periodic calls to the Is_Alive function 330. The cluster software on the first computer node then calls the Off_Line function 320 for all other resources in the same application dependency group as the failed resource. Then, on a second computer, the cluster software calls the On_Line function 310 of all the resources in the dependency group. When all the resources have come on line on the second computer, the failover is complete. A typical application migration is similar to the failover scenario except that no failure is detected. When the cluster administrator moves an application, the cluster software on the first computer node calls the Off_Line function 320 for all resources in the application's dependency group. Then, on a second computer, the cluster software calls the On_Line function 310 of all the resources in the dependency group. When all the resources have come on line on the second computer, the application migration is complete.

Figure 4:
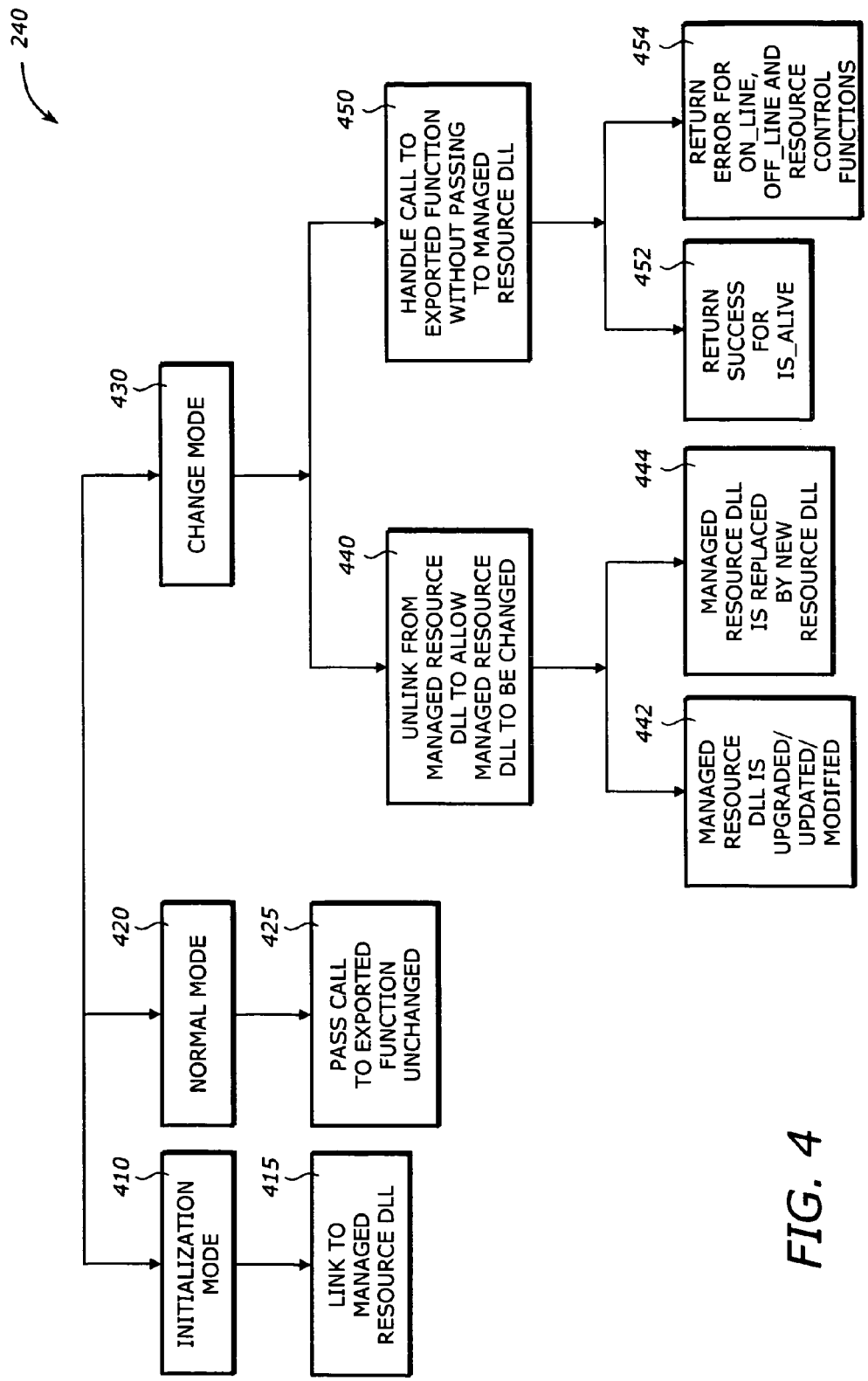
FIG. 4 is a diagram illustrating a shim resource DLL according to one embodiment of the invention.

FIG. 4 is a diagram illustrating the different modes of operation of the shim resource DLL 240 (shown in FIG. 2) according to one embodiment of the invention. The shim resource DLL 240 includes three modes of operation: an initialization mode 410, a normal mode 420, and a change mode 430.

The initialization mode 410 is a mode in which the resource management software 135 (shown in FIG. 1) is initialized or begins its operation. It is also a mode in which the change mode 430 has been completed, such as when the resource DLL 250 has been upgraded or replaced by a new resource DLL. In this mode, the shim resource DLL 240 is dynamically linked to the managed resource DLL 250 by a module 415. It is also dynamically linked to the resource manager 220.

The normal mode 420 is a mode in which the system or the managed resource DLL 250 operates normally or when the managed resource DLL 250 is not being changed, upgraded, updated, modified, or replaced. In this mode, the shim resource DLL 240 exports the same control functions as the managed resource DLL 250. It passes a call to an exported function (e.g., the On_Line function 310, the Off_Line function 320, the Is_Alive function 330, and the Resource Control function 340 shown in FIG. 3) unchanged, via a module 425. In addition to passing calls unchanged, the shim resource DLL 240 also receives call returns from the managed resource DLL 250 and forwards the call returns to the resource manager 220. In other words, in the normal mode 420, the exported functions act the same as if the cluster software were calling the managed resource DLL 250 directly.

The change mode 430 is a mode in which the managed resource DLL 250 is changed, such as when it is upgraded, updated, modified, or replaced by a new resource DLL. During this mode, it is desirable to keep the application program continuing to function without being taken down to maintain availability. In this mode, the shim resource 240 invokes an unlink module 440 and then a handle module 450. The unlink module 440 unlinks the shim resource DLL 240 from the managed resource DLL 250 to allow the managed resource DLL 250 to be changed. When the shim resource DLL 240 is unlinked from the managed resource DLL 250, it frees the managed resource DLL 250 for upgrade or replacement. The managed resource DLL 250 may be upgraded by a module 442 or replaced by a new version by a module 444. The modules 442 and 444 may be performed by another program or module. The handle module 450 handles a call to an exported function without passing the call to the managed resource DLL 250. By continuing handling calls to exported functions, the shim resource DLL 240 keeps the application program operational and avoids temporary interruption caused by change to the managed resource DLL 250. The handle module 450 performs its function by a success return module 452 and an error return module 454. The success return module 452 returns success to the calling program when the called exported function is a frequently called function such as the Is_Alive function 330. The error return module 454 returns error to the calling program when the called exported function is a non-frequently called function such as the On_Line function 310 or the Off_Line function 320 or the Resource Control function 340. Since the On_Line function 310, the Off_Line function 320, and the Resource Control function 340 are not called frequently, the probability that they are called when the managed resource DLL 250 is being changed is very low.

From the change mode, the shim resource DLL returns to the normal mode when a Resource Administration program calls the Resource Control function with appropriate implementation-specific control codes.

Figure 5:
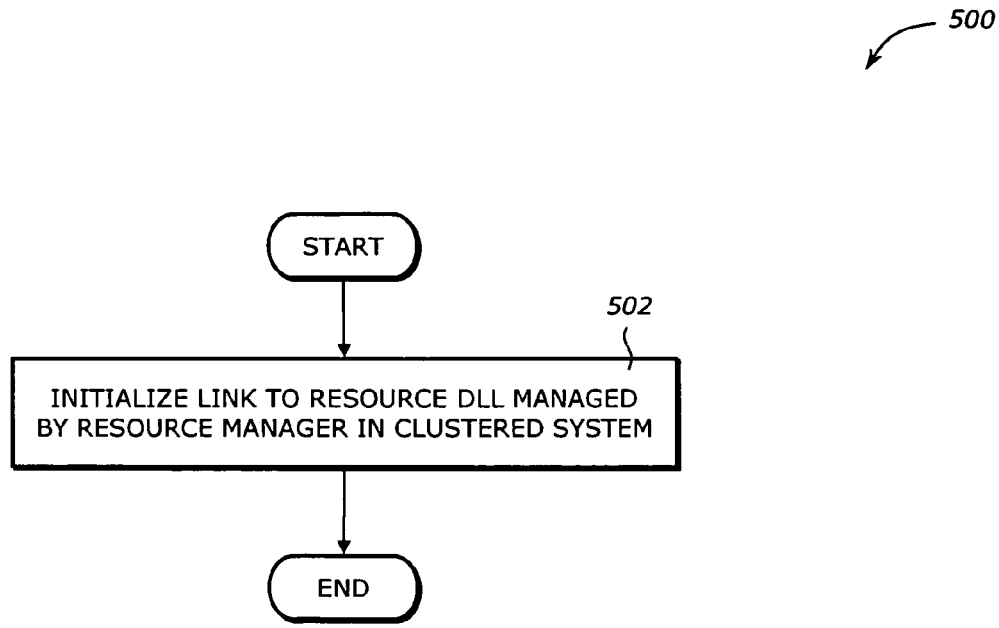
FIG. 5 is a flowchart illustrating a process 500 for initializing the shim resource DLL.

FIG. 5 is a flowchart illustrating a process 500 for initializing the shim resource DLL. Once the initialization is completed, the shim resource DLL is in the normal mode.

Upon Start, process 500 links to the managed resource DLL managed by the resource manager in a clustered system (Block 502). Process 500 may also link to the resource manager if it has not been linked. Process 500 is then terminated.

Figure 6:
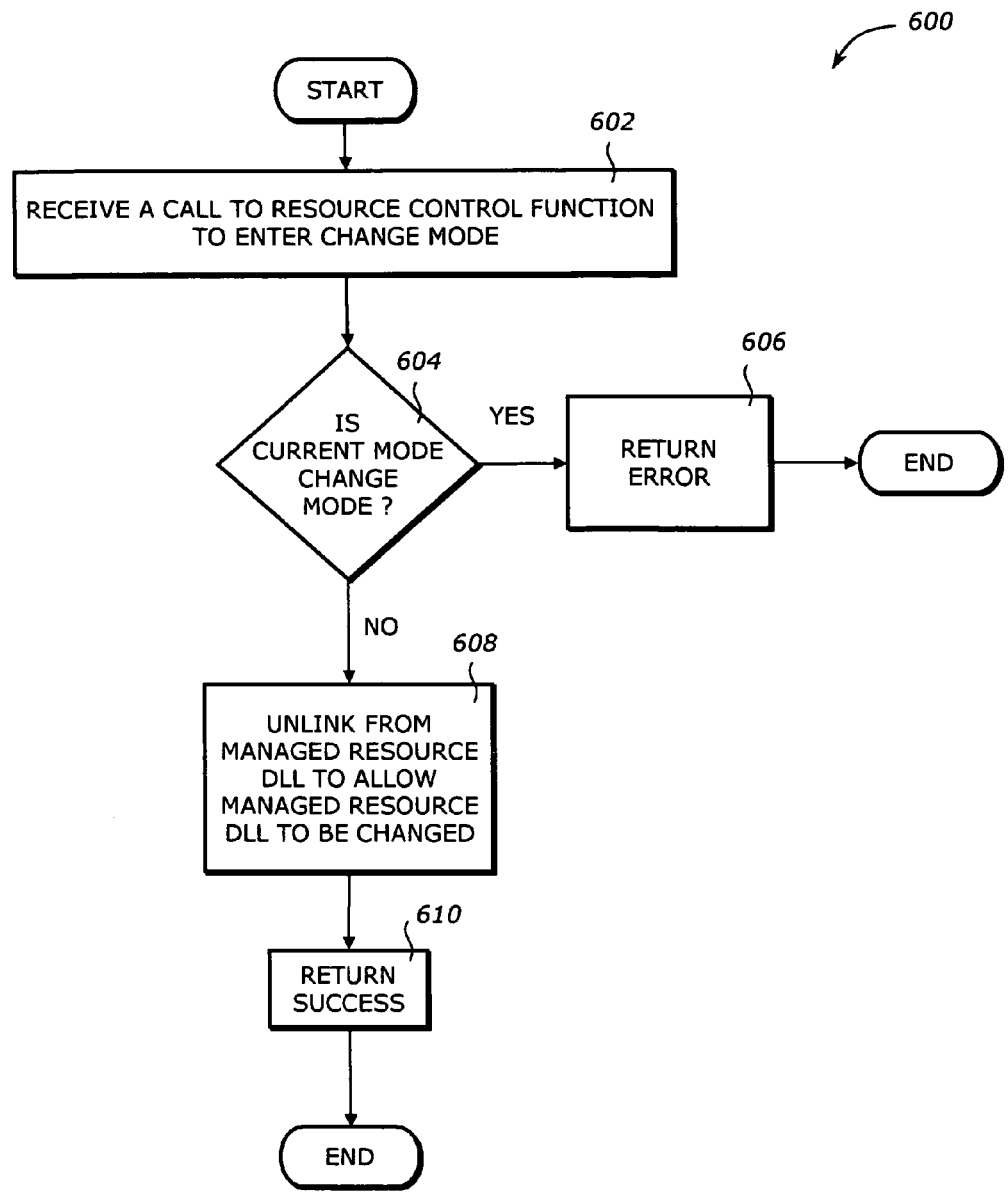
FIG. 6 is a flowchart illustrating a process 600 of the shim resource DLL for entering the change mode according to one embodiment of the invention.

FIG. 6 is a flowchart illustrating a process 600 of the shim resource DLL for entering the change mode according to one embodiment of the invention.

Upon Start, process 600 receives a call to the Resource Control function to enter the change mode (Block 602). Next, the process 600 determines if the current mode is the change mode (Block 604). If the current mode is already the change mode, the process 600 returns error (Block 606) and is then terminated. If the current mode is not the change mode, the process 600 unlinks from the managed resource DLL to allow it to be changed (Block 608), returns success (Block 610) and is then terminated. The managed resource DLL may be changed by being upgraded, modified, or replaced with a new version.

Figure 7:
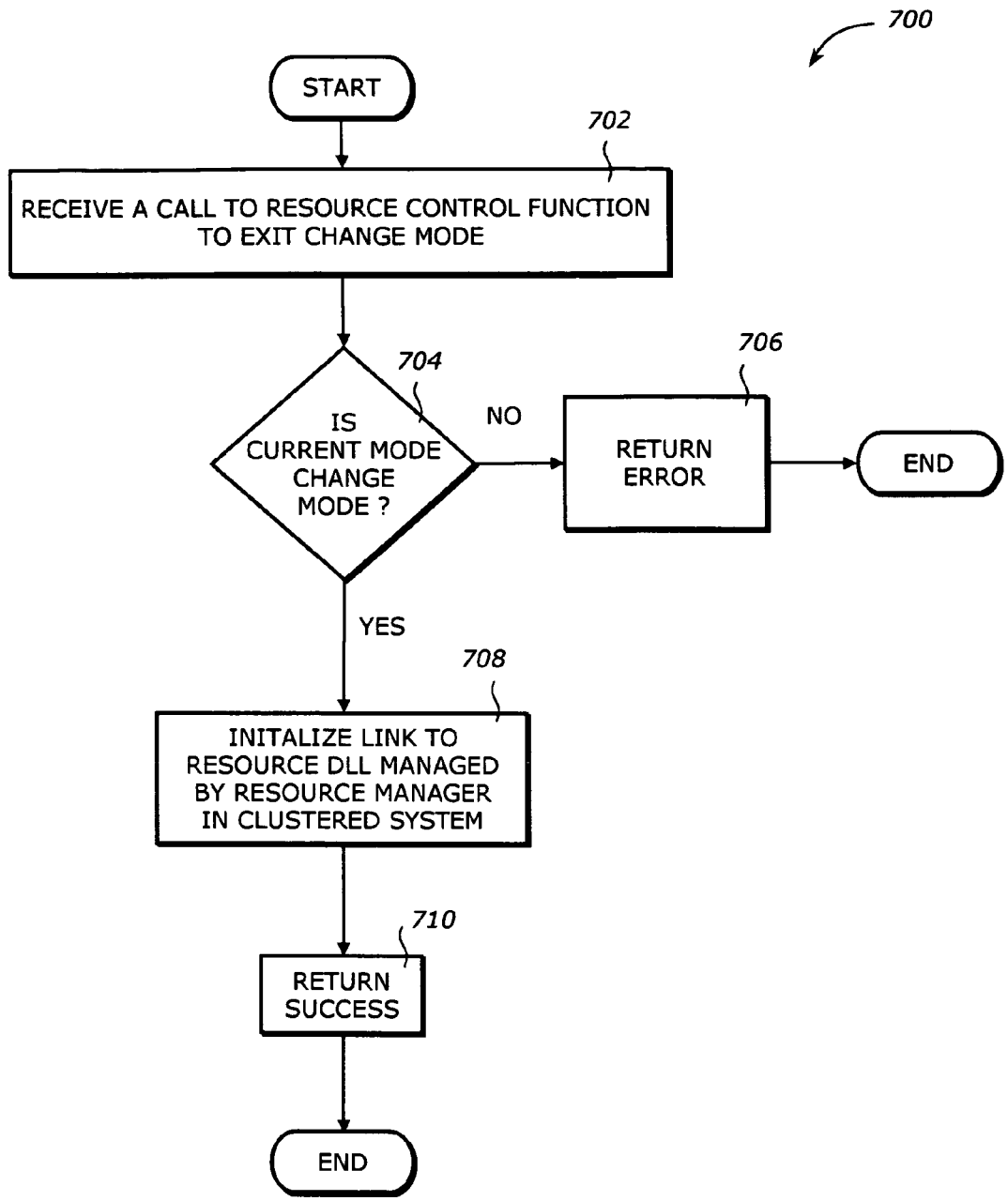
FIG. 7 is a flowchart illustrating a process 700 of the shim resource DLL for exiting the change mode according to one embodiment of the invention.

FIG. 7 is a flowchart illustrating a process 700 of the shim resource DLL for exiting the change mode according to one embodiment of the invention.

Upon Start, process 700 receives a call to the Resource Control function to exit the change mode (Block 702). Next, the process 700 determines if the current mode is the change mode (Block 704). If the current mode is not the change mode, the process 600 returns error (Block 706) and is then terminated. If the current mode is the change mode, process 500 links to the managed resource DLL managed by the resource manager in the clustered system (Block 708). Process 700 returns success (Block 710) and is then terminated. The managed resource DLL may be changed by being upgraded, modified, or replaced with a new version.

Figure 8:
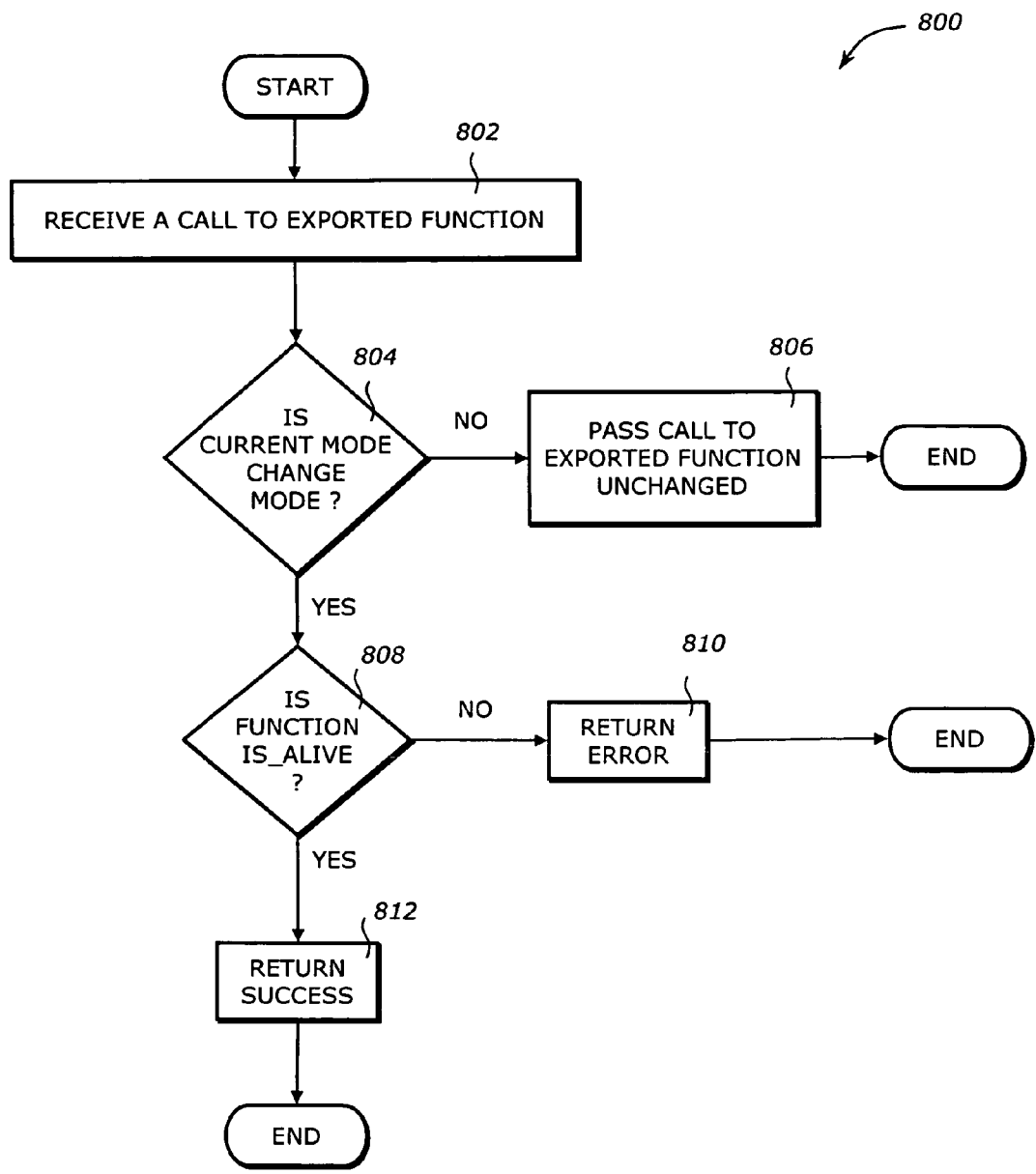
FIG. 8 is a flowchart illustrating a process 800 of the shim resource DLL for handling a call to an exported function according to one embodiment of the invention.

FIG. 8 is a flowchart illustrating a process 800 of the shim resource DLL for handling a call to an exported function according to one embodiment of the invention.

Upon START, process 800 receives a call to an exported function (Block 802). Next, the process 800 determines if the current mode is the change mode (Block 804). If the current mode is not the change mode, process 800 passes the call to the exported function to the managed resource DLL unchanged (Block 806) and is then terminated. If the current mode is the change mode, process 800 determines if the exported function being called is the Is_Alive function (Block 808). If it is the Is_Alive function, the process 800 returns success to the calling program (Block 812), and is then terminated. Otherwise, this means that the exported function being called is one of the On_Line function, the Off_Line function, and the Resource Control function; in this situation, the process 500 returns error to the calling program (Block 810), and is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method for maintaining application availability during a change of a resource dynamic link library (DLL) in a clustered system, the clustered system including a plurality of nodes, each of the nodes being a computer having a cluster software and a dependency group application, the cluster software including a resource manager and a shim resource dynamic link library (DLL), the dependency group application having the resource DLL managed by the resource manager, the method comprising:
   linking the shim resource DLL to the managed resource DLL, the managed resource DLL exporting a function to control a resource in the clustered system;
   passing, by the shim resource DLL, to the managed resource DLL a call to an exported function unchanged during a normal mode; and
   during a change mode, the shim resource DLL:
      unlinking from the managed resource DLL to allow the managed resource DLL to be changed, and
      handling a call to an exported function without passing the call to the managed resource DLL.

2. The method of claim 1 wherein linking comprises:
   dynamically linking the shim resource DLL to the managed resource DLL during an initialization mode or after the change mode.

3. The method of claim 1 wherein unlinking comprises:
   unlinking the shim resource DLL from the managed resource DLL to allow the managed resource to be upgraded or replaced with a new resource DLL.

4. The method of claim 1 wherein the function is one of an On_Line function, an Off_Line function, an Is_Alive function, and a Resource Control function.

5. The method of claim 4 wherein handling comprises returning success to a call to the Is_Alive function.

6. The method of claim 4 wherein handling comprises returning error to a call to one of the On_Line function, the Off_line function, and the Resource Control function.

7. The method of claim 1 wherein the resource is one of a mass storage device, a device driver, a network address, a network name, an application program, a system service, and a system software module.

8. A system comprising:
   a plurality of nodes forming a clustered system, each of the nodes being a computer having a cluster software and a dependency group application, the cluster software including a resource manager and a shim resource dynamic link library (DLL), the dependency group application having a resource DLL managed by the resource manager; and
   a plurality of resources coupled to the plurality of nodes, one of the resources being controlled by a function exported by the managed resource DLL;
   wherein the shim resource DLL is linked to the resource manager and the managed resource DLL to pass a call to the exported function to the managed resource DLL unchanged during a normal mode and is unlinked from the managed resource DLL to allow the managed resource DLL to be changed, and to handle a call to the exported function without passing the call to the managed resource DLL during a change mode.

9. The system of claim 8 wherein the shim resource DLL is dynamically linked to the managed resource DLL during an initialization mode or after the change mode.

10. The system of claim 8 wherein the managed resource DLL is upgraded or replaced by a new resource DLL during the change mode.

11. The system of claim 8 wherein the function is one of an On_Line function, an Off_Line function, an Is_Alive function, and a Resource Control function.

12. The system of claim 11 wherein the shim resource DLL returns success to a call to the Is_Alive function during the change mode.

13. The system of claim 11 wherein the shim resource DLL returns error to a call to one of the On_Line function, the Off_line function, and the Resource Control function.

14. The system of claim 9 wherein the one of the resources being controlled by a function exported by the managed resource DLL is one of a mass storage device, a device driver, a network address, a network name, an application program, a system service, and a system software module.

15. An article of manufacture comprising:
   a machine-accessible medium including data that, when accessed by a machine, cause the machine to perform operations comprising:
   linking a shim resource dynamic link library (DLL) to a resource DLL managed by a resource manager in a clustered system, wherein the clustered system including a plurality of nodes, each of the nodes being a computer having a cluster software and a dependency group application, the cluster software including the resource manager and the shim resource dynamic link library (DLL), the dependency group application having the resource DLL managed by the resource manager, the managed resource DLL exporting a function to control a resource in the clustered system;
   passing, by the shim resource DLL, to the managed resource DLL a call to an exported function unchanged during a normal mode; and
   during a change mode, the shim resource DLL:
      unlinking from the managed resource DLL to allow the managed resource DLL to be changed, and
      handling a call to an exported function without passing the call to the managed resource DLL.

16. The article of manufacture of claim 15 wherein the data causing the machine to perform the operation of linking comprises data that cause the machine to perform operations comprising dynamically linking to the managed resource DLL during an initialization mode or after the change mode.

17. The article of manufacture of claim 15 wherein the managed resource DLL is upgraded or replaced by a new resource DLL during the change mode.

18. The article of manufacture of claim 15 wherein the function is one of an On_Line function, an Off_Line function, an Is_Alive function, and a Resource Control function.

19. The article of manufacture of claim 18 wherein the data causing the machine to perform the operation of handling comprises data that cause the machine to perform operations comprising returning success to a call to the Is_Alive function.

20. The article of manufacture of claim 18 wherein the data causing the machine to perform the operation of handling comprises data that cause the machine to perform operations comprising returning error to a call to one of the On_Line function, the Off_Line function, and the Resource Control function.

* * * * *